United States Patent [19]

Oneil, Jr. et al.

[11] 4,004,131
[45] Jan. 18, 1977

[54] ARTICLE CARRYING CODED INDICIA

[75] Inventors: John Tettemer Oneil, Jr., Princeton; Angelo Pelios, Somerville; Allen Henry Simon, Hightstown, all of N.J.; Frank George Nickl, Northboro, Mass.

[73] Assignee: RCA Corporation, New York, N.Y.

[22] Filed: Oct. 24, 1974

[21] Appl. No.: 517,761

Related U.S. Application Data

[62] Division of Ser. No. 345,322, March 27, 1973.

[52] U.S. Cl. .................................. 235/61.12 N
[51] Int. Cl.² ................................. G06K 19/06
[58] Field of Search ............ 235/61.12 N, 61.12 M, 235/61.11 E

[56] References Cited

UNITED STATES PATENTS

| | | | |
|---|---|---|---|
| 3,671,718 | 6/1972 | Genzel et al. | 235/61.12 N |
| 3,752,961 | 8/1973 | Torrey | 235/61.12 N |
| 3,757,090 | 9/1973 | Haefeli et al. | 235/61.12 N |
| 3,796,863 | 3/1974 | Nickl et al. | 235/61.12 N |

*Primary Examiner* — Daryl W. Cook
*Attorney, Agent, or Firm* — Edward J. Norton; Joseph D. Lazar; Raymond E. Smiley

[57] ABSTRACT

A machine readable binary encoded label having start, data, and stop sections comprising concentric arcuate or linear bars of two different reflectivities.

The annular portions or bars are arranged into a coded array such that no more than four adjacent bars are of the same reflectivity type. The start and stop portions are arranged to provide to a scanner sufficient information to determine the scan rate of the scanner regardless of the rate of scan or dimension of bars merely by the scanning passage over the stop or start portion. Scanning circuits for transmitting data information from the data portion of the label to suitable data processing facilities includes a logic arrangement that automatically synchronizes the scanning circuit to the scanner device which may be a machine operating at a substantially constant scan rate or a hand-held wand operated within a wide range of scan rates.

1 Claim, 8 Drawing Figures

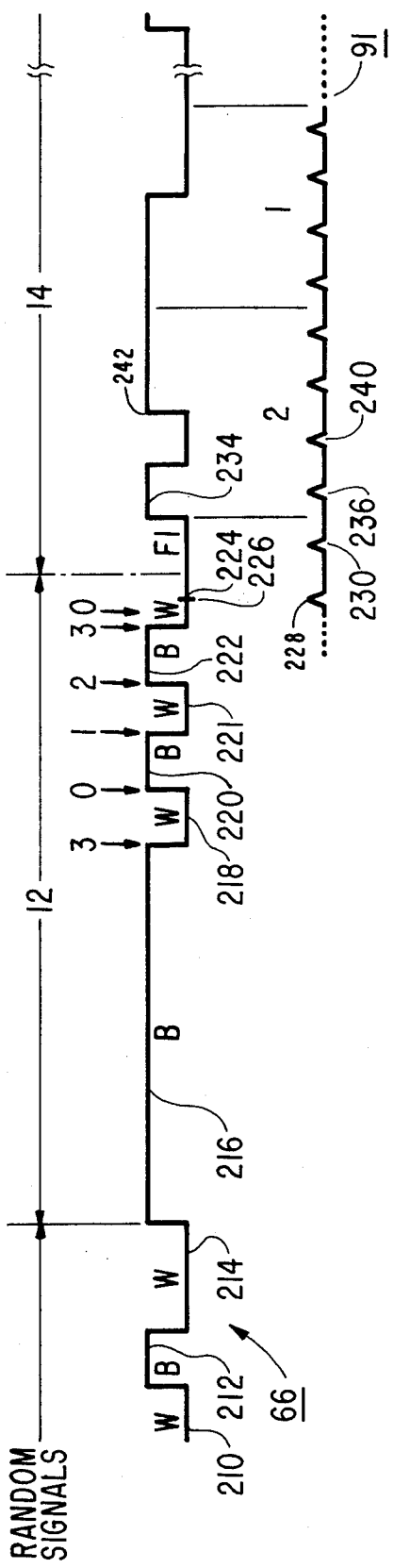

ARTICLE CARRYING CODED INDICIA

This is a division of application Ser. No. 345,322, filed Mar. 27, 1973.

CROSS REFERENCE TO COPENDING APPLICATIONS

A related application is S.N. 218,972 entitled "Optical Scanning Arrangement and Article Useful Therewith" filed Jan. 19, 1972, based on the invention of Frank George Nickl et al., now U.S. Pat. No. 3,796,863.

BACKGROUND OF THE INVENTION

Systems are known in which a binary encoded label on or attached to an article is employed either to identify the article or to provide some other information such as price, or in the case of mail, routing information (zip code), and in which optical scanning equipment is employed to read the label.

The labels may have a circular design so that orientation between the article to which the label is attached and the scanning equipment is not a problem. In some labels the information is coded as radial bars in two different colors such as black and white to represent binary digits "one" and "zero" respectively. An inner circumferential band of timing marks identifies the position of each data bit to the scanning equipment. The machines needed to make printing dies for bulk printed labels of the type described are very costly. In other systems the labels are printed with concentric rings to represent the information. Dies for making such labels may be easily machined but providing timing information on the label presents a problem. In the prior art the timing information for fixed invariable rates of scanning is most typically achieved by providing special timing bands at spaced radii from the center which increases the diameter of the label by the total width of the timing bands. Although such systems present a problem if the size of the label is important, they are still limited by the fixed rate of scanning required.

The above-identified copending application, assigned commonly to the assignee of the present application, discloses a label of circular design having a unique code integral with the arrangement of annuli to provide synchronizing information of a substantially fixed rate scanner.

SUMMARY OF THE INVENTION

An article of manufacture to be read by scanning equipment comprises a label and a plurality of side-by-side information representing indicia, in two contrasting characteristics or properties representing the bits 1 and 0 respectively, on the label.

The indicia are provided with a start, data, and stop portion together capable of being scanned and thereby read in either scan direction across the indicia. The start and symmetric stop portions are respectively coded to establish to a scanner the rate of movement of the scanner over the coded start or stop portion to synchronize the scanning circuit thereafter to whatever scan rate is selected or whatever the size of the indicia. The indicia are so arranged to provide data information with no more than four adjacent indicia which provided a basis for automatically synchronizing to any scan rate.

In an additional aspect of the invention, the labels are used with suitable scanning equipment having a clock pulse generator which is automatically synchronized to the rate of scanning the label and automatically thereafter is maintained to that rate or is altered that rate in accordance with the scanning rate of the scanning equipment.

BRIEF DESCRIPTION OF THE DRAWING

FIG. 6 is a chart illustrating a typical series of pulse manifesting a scan over a label of the invention.

FIG. 7 is a table (Table 2) of typical counts for the operation of FIG. 4.

DETAILED DESCRIPTION OF A PREFERRED EMBODIMENT

Figure 1:
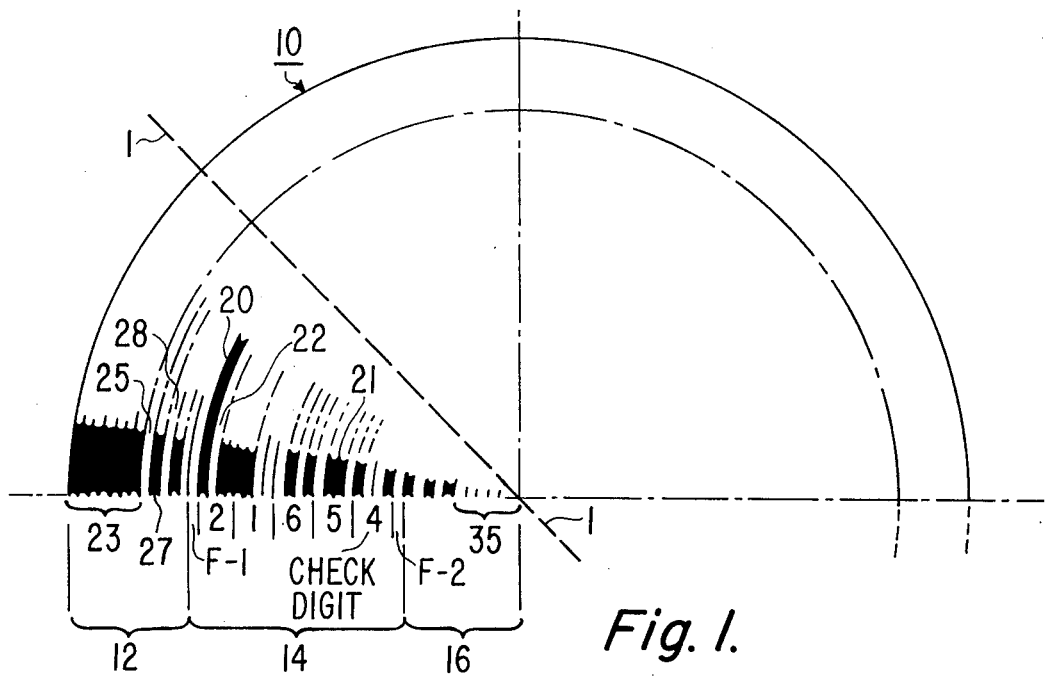
FIG. 1 is pictorial representation of one embodiment of the invention pictorially represented by a semicircular label.

FIG. 1 shows a machine readable label 10 for use in article identification. The label may be on a sheet of paper which is glued or otherwise attached to the article to be identified or it may be printed directly on the article. Such a label, which is particularly suited for use in supermarkets, may contain coded information relating to any one or more of price, weight, size, manufacturers' code, brand name and description of the goods, as examples. The label may be circular in shape with a portion up to one half a diameter missing to conserve space to permit optical scanning equipment such as that to be described in FIGS. 3–5 to "read" the label along any line passing through the arcuate center or nearly so of the label such as dashed line 1—1 of FIG. 1, without concern for orientation. Alternately the label may be in the form of side-by-side bars. The label contains a start section 12, a data section 14 and a stop section 16.

Each section may contain a plurality of annular bands of first and second reflectivities for representing the binary digits "one" and "zero." For example, a white band may represent one or more binary "ones" while a black band may represent one or more binary "zeroes." Any two colors may be chosen which have substantially differing reflectivities to the optical scanning equipment employed to read the labels.

The data section contains a number of bands, each some integral multiple from 1 to N of a given unit width U, such as 0.05 inch, as measured along line 1—1 or any other diameter. In the example of FIG. 1, if the black band 20 is 0.05 inches wide, it represents one "zero" bit; if the black band 21 is 0.10 inches (i.e., two units) wide, it represents two adjacent "zero" bits. The same holds for the white annuli such as 22 which represent "one" bits.

Figure 2B:
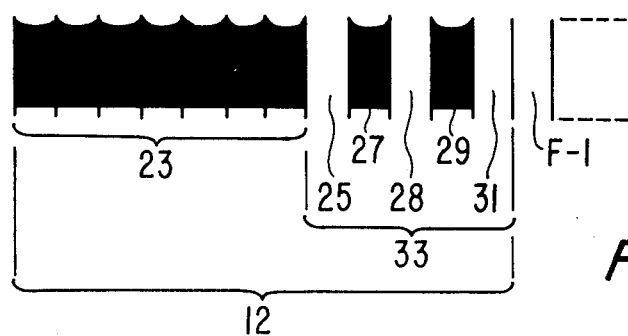
FIG. 2b is an enlarged fragmentary portion of a label showing details of a start (or stop) portion.
Figure 2A:
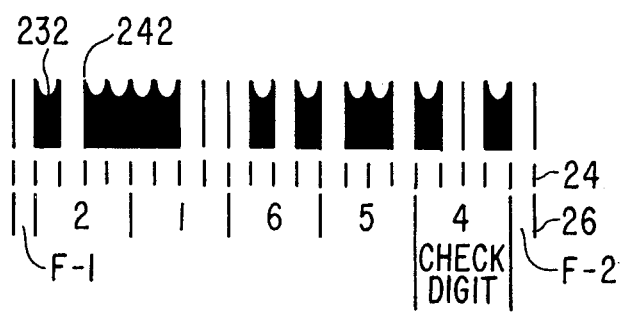
FIG. 2a is an enlarged fragmentary portion of a label showing details of a typical data portion.

The data section may be subdivided into groups, each group consisting of four adjacent regions or bars which represent one binary coded digit such as one decimal digit. There may be any number of such groups. For example, FIG. 2a shows a data section 14 of FIG. 1 illustrated in parallel bar form for convenience, representing five groups of binary digits, each group coded in the way shown in Table 1 below, the five groups defining the five decimal digits of number 21654. Lines 24 and 26 denote respectively the boundaries between adjacent bit positions and decimal digit positions.

The last digit 4 is a check digit in "modulo 10" for the sum of the first four digits. That is, the decimal value of the first four digits is summed and a value equal to the units position of that summation is used as the check digit. In the example of FIG. 2a the sum of 2 + 1 + 6 + 5 + = 14, so that the "modulo 10" of the check digit is 4. The check digit is utilized in suitable logic circuits in a manner known in the art forming no part of the present invention.

The data section may include flag bits on either or both ends of the decimal data portion as indicated by the F1 and F2 designators. These flag bits may modify the meaning of the data in some predetermined way. For example, F1 = 1 may mean the decimal data is indicative of price, while F1 = 0 may mean the decimal data is indicative of a part number, and so forth. The check digit may be modified to include the combined value of the flag bits if desired.

It is possible that a data pattern could develop such that many adjacent unit widths could be one color. This would present no problem to the optical scanning equipment to be described if the unit or bar widths could be accurately maintained from label to label, the label were always a known fixed distance from the reading equipment, and the optical scanning device were always moved at a known fixed speed across the label.

In practice, none of the above conditions is met. The printing on labels is not perfect, and it is desirable to allow different bar widths on different labels, the label may be different distances from the light sensing means of the optical scanner, and the optical scanning device may be a hand-held wand propelled at other than a given known speed. For example, the label may be on the flat surface of an article immediately adjacent to the slot through which the light beam is scanned. Further, the label may vary in distance from the slot such as when it is on the concave bottom of an aerosol can or on an irregularly shaped package of vegetables. It is therefore preferred that there be a clocking scheme built into the label.

According to the present invention, errors due to non-linear or varying speeds of the optical scanner scanning the label as well as non-uniform bar widths from label to label are overcome by limiting the maximum number of adjacent bars of one bit value (or color) to a value depending on the selected code. In the present embodiment, as will be described, the maximum number of adjacent similar bits is four.

Table 1 below illustrates a code scheme in which there are no more than two adjacent "one" bits or two adjacent "zero" bits in any of the ten decimal digits. Therefore, in two adjacent decimal digits there are never more than four adjacent "one" bits or four adjacent "zero" bits. Thus, a transition from white to black or black to white will always occur after no more than four adjacent bars or four adjacent regions of unit width, the number of bits required to represent one decimal digit. According to the invention mechanically driven scanning equipment is provided which operates within all tolerance buildups expected in four adjacent regions of a given color. The equipment is arranged to reset or rephase each time a transition from white to black or black to white occurs after scanning four bits, even though a transition occurs during such four bits. Thus, rephasing or resetting occurs during the scanning of between four and seven bars.

Table 1

| Decimal Numbers | Bit Position | 0 | 1 | 2 | 3 | 4 | 5 | 6 | 7 | 8 | 9 |
|---|---|---|---|---|---|---|---|---|---|---|---|
| Binary Designation | $2^3$ | 0 | 0 | 0 | 0 | 0 | 1 | 1 | 1 | 1 | 1 |
| | $2^2$ | 0 | 0 | 1 | 1 | 1 | 0 | 0 | 0 | 1 | 1 |
| | $2^1$ | 1 | 1 | 0 | 0 | 1 | 0 | 1 | 1 | 0 | 0 |
| | $2^0$ | 0 | 1 | 0 | 1 | 0 | 1 | 0 | 1 | 0 | 1 |

Referring again to FIG. 1, it is seen that a start section 12 precedes and a stop section 16 follows the data section 14. The start section consists of more than four bars, such as at least five adjacent bars (seven being illustrated and preferred) of unit width of one reflectivity, followed by five bars of single unit width of the alternating reflectivity. It should be noted that more than four bars are used to distinguish from the maximum number of adjacent bars four of one reflectivity that can occur in the data section 14. FIG. 1 and FIG. 2b illustrate a black B outer annular band 23 of seven bars followed by a white W annular bar 25, black bar 27, white bar 28, black bar 29, and white bar 31. Portion 33 of start section 12 consisting thus of bars 25, 27, 28, 29 and 31 (WBWBW) serves to function as a synchronizing code or simply sync code for the scanning apparatus of the invention. The stop section 16 (FIG. 1) is arranged in reverse order radially inwardly, i.e., BWBWB, followed by a wide white band of several bars such as 11, to form a zone 35 at the center of the label. Such a reversal in color between the start 12 and stop 16 sections permits the scanning equipment, to be described, to easily determine in which direction a scan is occurring, i.e., outside to center of the label or vice versa.

It should be noted that the center zone 35 as explained in U.S. Pat. No. 3,708,655, is arranged to be large enough in the numbers of bars it contains (which, thus, determine the area of the center zone) to permit scanning the label to achieve a valid "read" of the coded label without scanning directly through the center.

It should be noted that the terms "start" and "stop" are relative. If the label is read from the center toward the outside the so-called "stop" section then functions as the "start" section. This is so since the scanning apparatus can read the coded label radially inwardly or radially outwardly, depending on the orientation of the label relative to the scanning apparatus. The bits of the data read, of course, will be in reverse for each such direction of scanning. The logic circuits forming no part of this invention may be arranged within the skills of the art, to recognize and properly decode such data regardless of the direction it was scanned.

One purpose of the start section 12 is to enable the scanning equipment to determine the amount of time it requires to cross a bar of a single unit width so that when the scan continues into the data portion, the number of bars of a given color being scanned may be determined. For example, if the scanning equipment requires one micro-second to scan a bar in the start section and thereafter requires three micro-seconds to cross a multi-bar band in the data section, that band must represent three bars.

Figure 3:
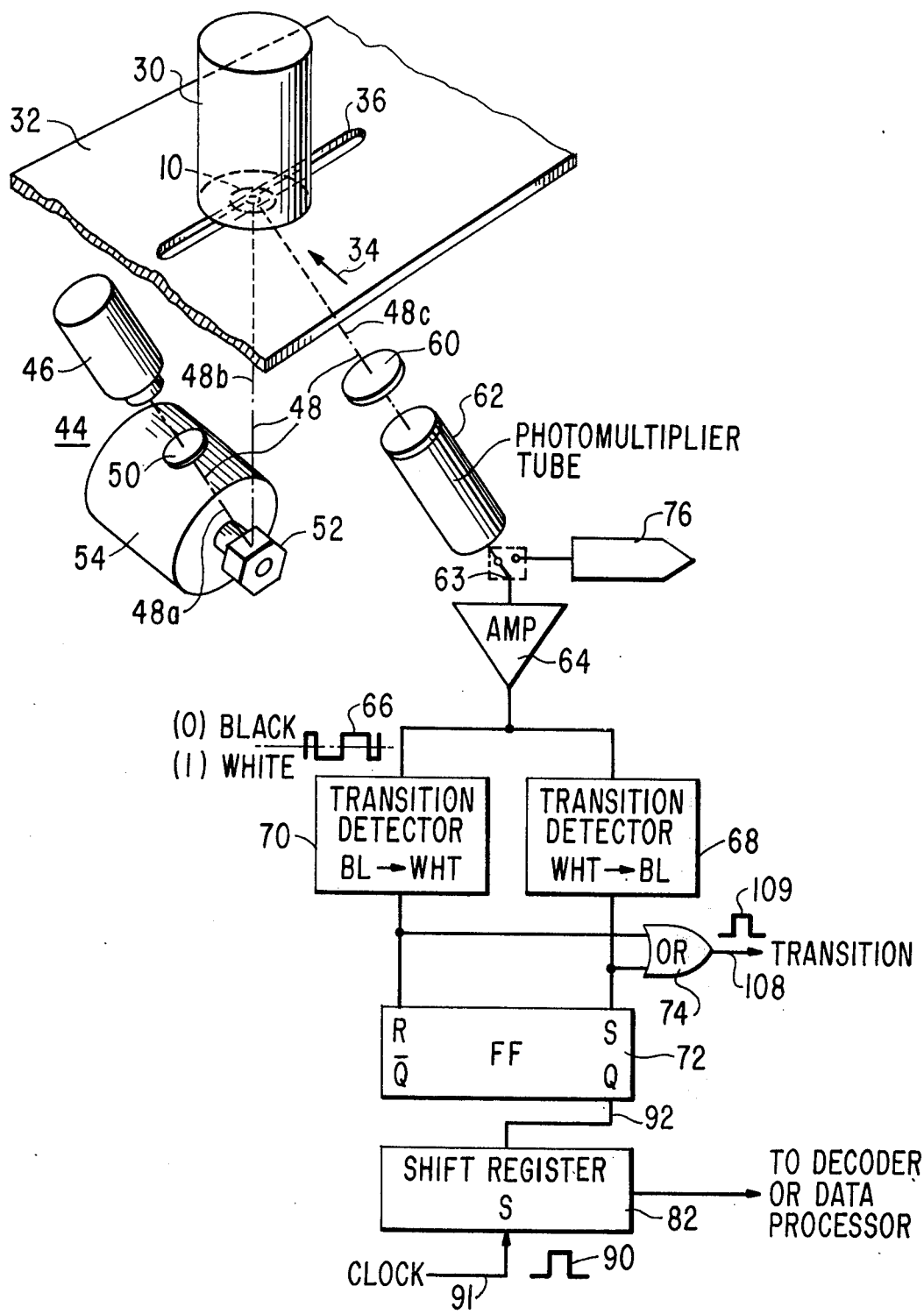
FIG. 3 is an apparatus for scanning a label according to the invention.

FIG. 3 is a schematic of a reading station 44 of an optical scanner which may be used for reading a label according to the invention. A more detailed description of a suitable scanner may be found in U.S. Pat. No. 3,708,655.

Label 10 is attached to a suitable surface, such as the bottom of an article 30. Article 30 is passed along an opaque plate 32 generally in the direction of arrow 34. Such movement may be accomplished manually or by a suitable conveyer system (not shown). Plate 32 is formed with a slot 36 therethrough extending in a direction generally transverse the direction in which article 30 is moved. Slot 36 may, for example, be ¼ inch wide and 6 inches long. It is through this slot 36 that optical scanning takes place. A light source 46 for the optical scanning beam may be a laser or other light source for emitting a light beam 48a in the visible or near visible spectrum. For example, source 46 may be a helium-neon laser that is pumped to produce a continuous laser beam of red monochromatic light of approximately 6,328 Angstrom wavelength.

Light 48a from source 46 is focused by a lens system 50, to a multifaced mirror 52. Mirror 52 is rotatably mounted on a motor 54 operating at substantially constant speed. Mirror 52 is positioned to intercept light beam 48a and project this beam 48b through slot 36 in plate 32 as a moving spot on the label. Rotation of mirror 52 causes a succession of light beam scans along and through the slot 36 and, accordingly, across a label 10 positioned thereover. The number and size of the faces of mirror 52 are selected to produce only one scanning spot on the underside of an article 30 during any scanning period.

Reading station 44 also includes an optical band pass filter 60 in the path of the reflected beam 48c and a photoresponsive pick-up device such as photomultiplier tube (PMT) 62 beyond the filter positioned to receive diffused light reflected from label 10 or from any article 30 positioned over slot 36. Diffused light rather than specular light is used because specular reflection tends to make a label 10 unreadable. Optical filter 60 is matched substantially to preferably monochromatical light emitted by light source 46 and filters out light having wavelengths not within the pass band of filter 60. PMT 62 converts the diffused light in the reflected signal derived from scanning label 10 into an electrical signal, the amplitude of which corresponds to the amount of light being reflected from the label at any instant in time, noting that more light is reflected from one color (white) than the other (black). PMT 62 is coupled through a two-position switch 63 to an amplifier 64, as shown. When operated to the other position, switch 63 is connected to a suitable hand-held optical scanning device or wand 76. Wand 76 typically is provided with a light source and photo transducer adapted to read a label as the wand is moved over the label 10 by an operator. Wand 76 is preferably moved during its scanning operation at relatively constant speed, but, as will be discussed, some speed variation will be tolerated allowing for accurate reading of the label because of the unique design of the label.

Using either optical scanning method (that is, a wand 76 or a fixed position reading station 44), amplifier 64 amplifies the resulting signal to produce waveform 66 as beam 48b scans across a label 10. That is, it may produce a relatively low amplitude voltage arbitrarily called a binary "one" when beam 48a is scanning across a white annulus and may produce a relatively high amplitude voltage arbitrarily called a binary "zero" when beam 48a is scanning across a black annulus.

Amplifier 64 is coupled to two conventional transition detectors 68 and 70. Transition detector 68 produces a momentary pulse whenever a transition from white to black occurs, and transition detector 70 produces a momentary pulse when a transition from black to white occurs. The signals produced by transition detectors 68 and 70 are applied to the set (S) and reset (R) input terminals, respectively, of a flip-flop 72. The respective outputs of transition detectors 68 and 70 are also coupled to OR gate 74 which produces a transition pulse 109 on conductor path 108 whenever a transition from black to white or white to black occurs.

Figure 4:
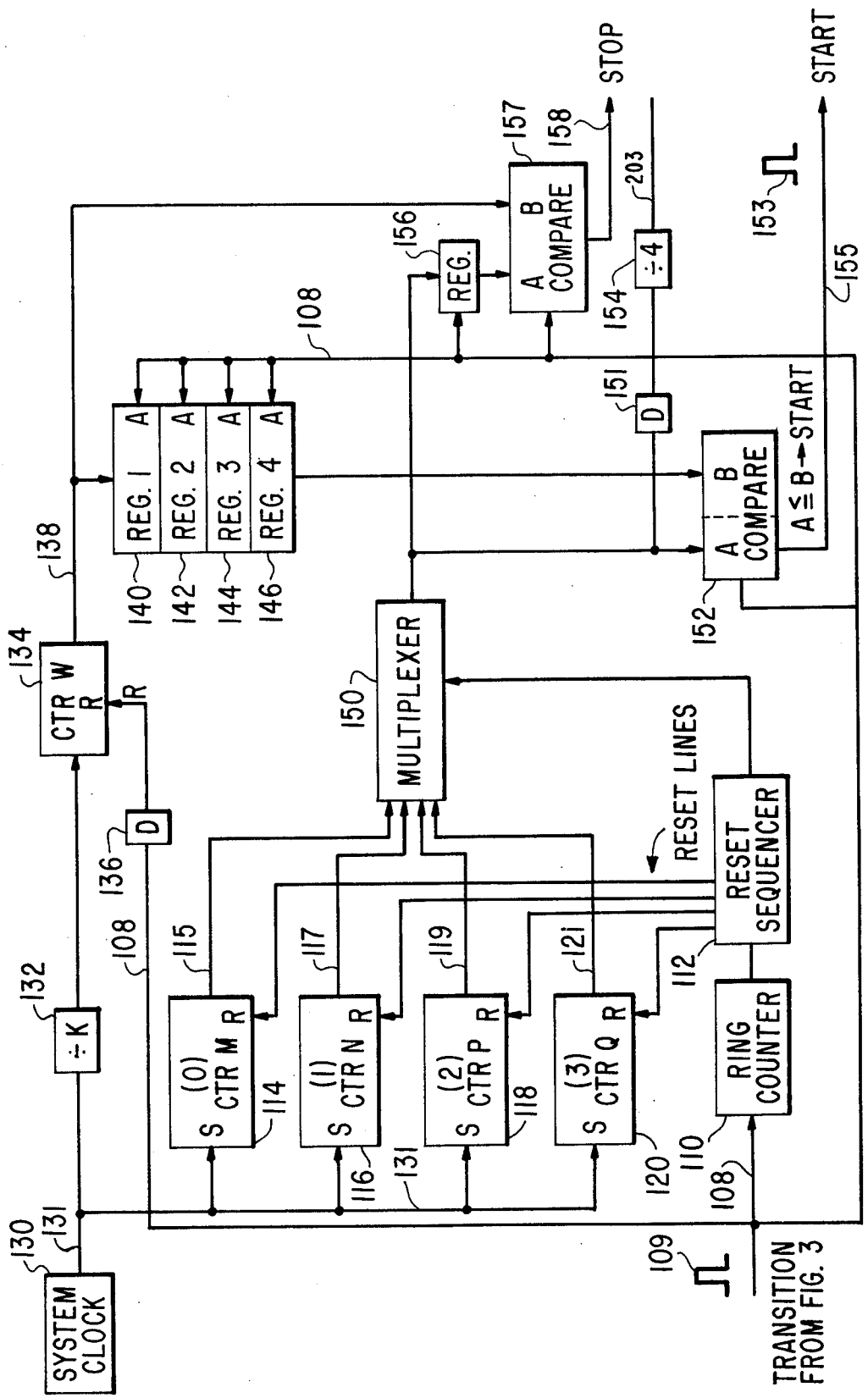
FIG. 4 is a circuit schematic embodying a stop-start code detector of the invention.

Referring next to FIG. 4, transition signal 109 is coupled over path 108 (from FIG. 3) to a four-stage ring counter 110, the output of which is adapted to control a reset sequencer 112. As each transition pulse 109 occurs, ring counter 110 advances through counts of 0, 1, 2, 3, 0, and so forth. Reset sequencer 112 is coupled to reset terminals R of each of four counters 114, 116, 118 and 120, respectively, and is arranged to generate pulses to reset the counters in successive order as each transition pulse 109 is received by ring counter 110, and simultaneously to transfer the accumulated count in each respective counter to multiplexer 150 to be described. The number is parenthesis in each of counters 114–120 corresponds to the respective position counts for resetting by the reset sequencer 112. Thus, counter 118 is reset when ring counter 110 steps to its count position 2

A system clock 130, which is suitably a multivibrator, is arranged to produce a series of continuous pulses on bus path 131 at a rate which is substantially higher than the rate at which scanner 44 (FIG. 3) is expected to scan across label 10. By way of example, system clock 130 may produce as few as 20 pulses during the time required for the scan across one unit width of the label 10. The criteria for the clock rate is a function of the speed of the mechanical scanner and the width of each bar of the coded label as will be apparent to those skilled in this art in view of the description of the embodiment given herein. Clock 130 is coupled directly to the step (S) or advance terminals of counters 114–120, and through a divide-by-K circuit 132, to the S terminal of counter 134. Transition signal 109 is coupled through a short-delay circuit 136 to the reset R terminal of counter 134, the delay through which being of substantially less duration than the period of the pulses of system clock 130. Assuming that K in circuit 132 is 3/2, counter 134 will advance by a count of two for each three pulses from system clock 130 until such time as it is reset by transition signal 109 delayed.

Counter 134 is coupled by a multi-conductor cable 138 to a set of four push-down conventional registers 140, 142, 144, and 146. Advance from one register (140–146) to the next lower register (as shown in FIG. 4) is effected by transition signal 109, which is passed to the advance (A) input of each of the registers over path 108.

The output of each of counters 114–120 is coupled by multi-conductor cables 115, 117, 119 and 121 respectively to a multiplexer 150. The output of multiplexer 150 is coupled to one input A of a compare registor 152 and to a divide-by-4 circuit 154 through a delay 151. The output of push-down register 146 is coupled to the second input B side of compare register 152. Transition signal 109 enables the comparison function in compare register 152. The circuit is arraned so that if at any time the amount in the portion of register 152 coupled (input A) to multiplexer 150 is less than or equal to the amount in the portion coupled (input B) to register 146, a short duration START pulse 153 is produced over path 155.

Multiplexer 150 is also coupled to a register 156 which, in turn, transfer its registered data to the A portion of compare register 157 in response to transition signal 109 over path 108. The B portion receives its register data from counter (W) 138. As will be explained, when the date of the portion A of comparator 157 is less or equal to the data of the B portion, a "STOP" signal over path 158 will be generated.

Figure 5:
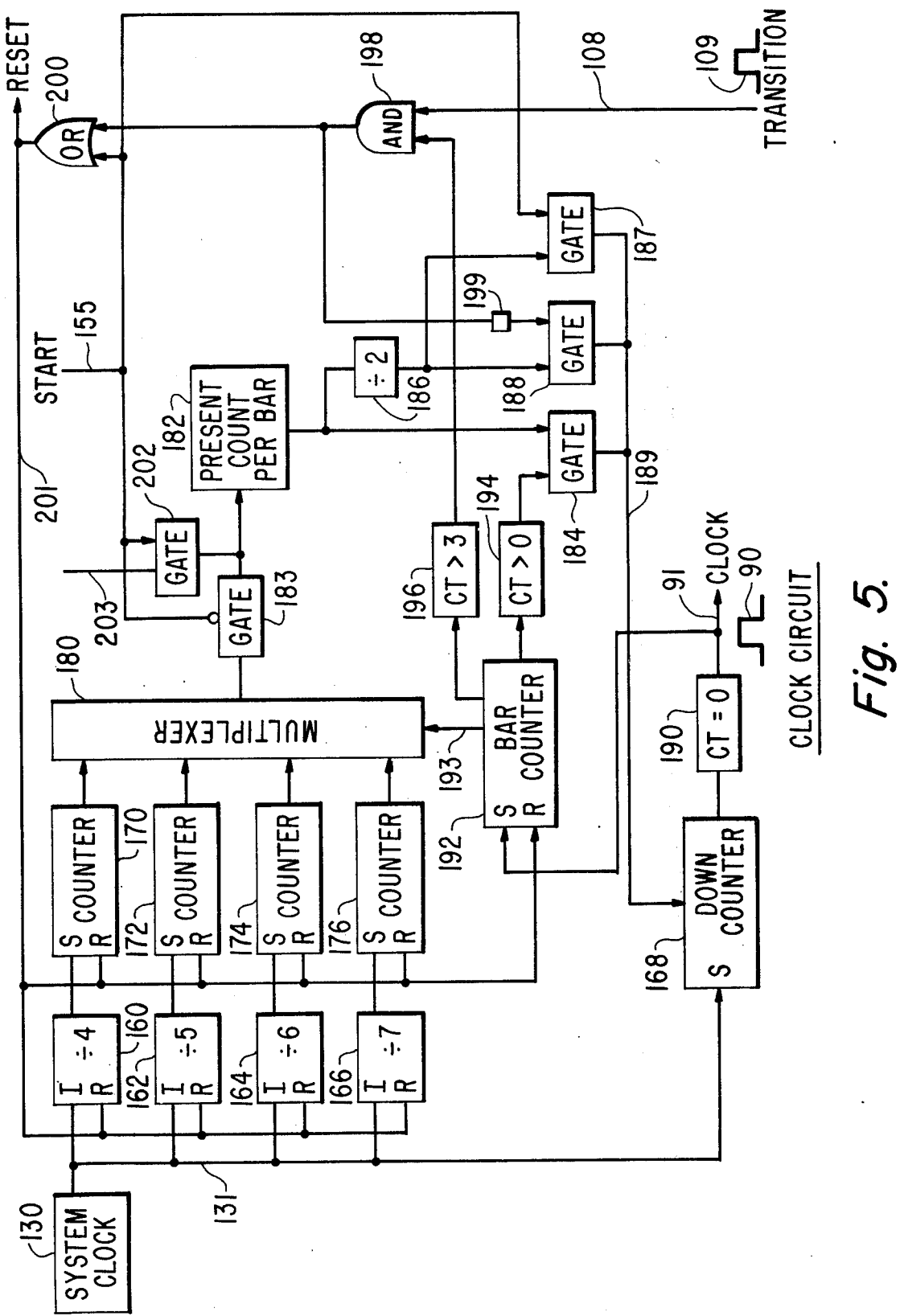
FIG. 5 is a circuit schematic embodying a clock pulse generator according to the invention.

Referring next to FIG. 5, system clock 130, the same clock shown in FIG. 4, is coupled by path 131 to the respective input (I) terminals of divide-by-4 circuit 160, divide-by-5 circuit 162, divide-by-6 circuit 164, divide-by-7 circuit 166, and the S terminal of Down Counter 168. The output of the divide-by-4 circuit 160 is coupled to the S input terminal of Down Counter 168. The output of the divide-by-4 circuit 160 is coupled to the S input terminal of counter 170, producing one pulse to step counter 170 for each four pulses produced by system clock 130. In like manner, circuits 162, 164 and 166 are coupled respectively to the S input terminals of counters 172, 174 and 176 producing one pulse to step counter 172 after five clock 130 pulses, counter 174 after six clock 130 pulses, and 176 after seven clock 130 pulses.

The output terminals of each of counters 170–176 are coupled respectively to conventional multiplexer 180. The output terminal of multiplexer 180, via inhibit gate 183 is coupled to a suitable register 182 to provide a Present Count Per Bar Register. The multiple output of register 182 is coupled directly to the input terminal of gate 184 and through a divide-by-2 circuit 186 to gates 188 and 187. The output of gates 184, 187 and 188 are commonly connected and coupled to path 189 to the input terminal of Down Counter 168, which is adapted to be "jammed" with data from register 182 passed through any of gates 184, 187 or 188. The output of down counter 168 is coupled to a decoder 190 which produces a short duration clock pulse 90 each time counter 168 is counted down to zero. Clock pulse 90 is passed to the S input terminal of a counter 192 serving as a Bar Counter. One output terminal of Bar Count 192 is coupled by a multi-conductor cable 193 to control the operation of multiplexer 180. A second and third output of counter 192 are coupled to two decoders 194 and 196 respectively. Decoder 194 is arranged to produce a short duration pulse when counter 192 is at any value greater than zero, but only during the time that the clock signal 90 is present at the counter 192 S terminal. Decoder 196 is arranged to produce a pulse whenever Bar counter 192 contains a value in excess of three.

The output of decoder 194 is coupled to control gate 184 enabling passage of the count stored in register 182 to Down Counter 168 only when a pulse is present from decoder 194. Decoder 196 is coupled to one input of AND gate 198, while TRANSITION signal 109 is coupled over path 108 to the second input of the AND gate 198. The output of AND gate 198 is coupled via delay 199 to control the operation of gate 188 and as one input to OR gate 200. The START signal 153 from compare register 152 (FIG. 4) is passed over path 155 to the second input of OR gate 200, and to gate 202. The output of OR gate 200, labelled RESET, is coupled over bus path 201 to the respective RESET (R) terminals of divide circuits 160–166, counters 170–176, and counter 192. The output terminal of divide-by-4 circuit 154 (FIG. 4) is coupled by a multi-conductor cable 203 to gate 202 (FIG. 5). The output of gate 202 is coupled to the input terminal of register 182 in common with the output from multiplexer 180.

DESCRIPTION OF OPERATION

The operation of the optical scanning apparatus of FIGS. 3–5 will now be described in conjunction with the timing diagram FIG. 6. Assuming that scanner assembly 34 is scanning across the bottom of container 30 provided both with printed matter and a label 10, the output 66 of amplifier 64 may be of the form illustrated in FIG. 6.

That is, the scan may first be over a "white" portion of the container manifested as pulse 210, then over a "black" portion of the container manifested as pulse 212, then over a "white" portion of the container manifested as pulse 214, and finally over the "start" portion 23 of label 10 (FIGS. 1 and 2b) manifested by pulse 216. As transitions from white portions to black portions occur, transition detector 68 produces a momentary pulse, while transitions from black portions to white portions causes transition detector 70 to produce a short duration pulse. These pulses are ORed together in OR gate 74 to produce transition pulses 109. The transition detectors also cause Flip Flop 72 to be placed in a state indicative of whether a white portion or a black portion of the label or printed matter on the container is being scanned.

Referring now specifically to FIG. 4, system clock 130 it should be understood, is running continuously producing pulses at a rate far in excess of the relative velocity of the scanning beam over the container 30.

In the preferred form of the invention, the clock rate is arranged to produce clock pulses such that 42 pulses are produced during the time required to scan one bar by the scanner equipment 44. As each transition occurs, a transition being a change from a black portion to a white portion or vice versa, the transition signals 109 manifesting transitions advances ring counter 110 by one. Also, concurrently pulses from the system clock 130 are advancing counters 114–120 and at a rate 2/3 as fast advancing counter 134 (assuming the factor K of circuit 132 to be 3/2). As the scanner scans from container 30 to its label 10 manifested by the change from pulse 214 to pulse 216 (FIG. 6) as explained above, a transition pulse 109 is generated. This transition 109 after a short delay, as determined by delay 136, will reset counter 134 to zero. As the scan continues across label portion 25 (FIGS. 1 and 2b) clock (130) pulses cause counter 134 to begin to count at a rate 2/3 as fast as signals produced by clock 130. Counters 114–120 will be counting by the clock pulses from preexisting numbers of no significant value, as will be understood. As another transition occurs as manifested by a change in pulse 216 to 218 (FIG. 6), the resulting transition signal 109 will cause the count contained in counter 134 to be entered into register 140. This same transition pulse 109 causes the previously stored numbers in each of registers 140, 142, and 144 to be transferred to registers 142, 144 and 146, respectively, noting that the contents of registers 140–146 for this transition scan is not significant. The transition 109 delayed by the amount of delay in circuit 136 will shortly thereafter but prior to the next succeeding clock pulse from source 130, reset counter 134 to zero. Also the transition signal 109 will advance the ring counter 110 by one. Assuming the ring counter 110 is at a count of "3," the transition pulse 109 will advance the counter 110 to "0," resetting the one of counters 114–120 which corresponds to the count in that ring counter, namely counter 114. As the scan continues manifested by changes in pulse 218 to 220 another transition will occur as previously described. This transition will cause the count in counter 134 to be entered into register 140, the count in that stage to be entered onto the next register 142, and so on. It will be noted that the count accumulated in register 134 during the periods between transition is 2/3 of the clock count.

As each transition signal 109 occurs, reset sequencer 112 controlled by counter 110 causes the counts of the one of counters 114–120 which corresponds to the number in the ring counter to be entered into multiplexer 150 and causes that counter to be reset to zero. At that time, the counter that is then being reset to zero will contain the number of system clock pulses produced during the time interval since the last four transitions 109 of the label 10. At the same time, register 146 will contain a count equal to 2/3 of the number of pulses produced by clock 130 preceeding the fourth most recent transition. By way of a numerical example, assume that the clock produces 42 pulses during the time required to scan across a bar on label 10 and that pulse 216 (FIG. 6) corresponds to seven bars in width. Therefore, as a transition 109 between portion 222 and 224 occurs, noting that this is the fifth transition following the period of pulse 216, register 146 will have contained a count of 196 (7 × 42 ÷ 3/2). The transition pulse 109 is manifested by the change in pulse 222 to 224 will cause that number 196 to be entered into the B portion of compare circuit 152. Concurrently, the transition signal through ring counter 110 changes it from 3 to 0 causes through reset synchronizer 112 the contents of counter 114 to pass through multiplexer 150 into the A portion of compare circuit 152. Counter 114 will have contained a count of 168 (4 × 42) since it has been accumulating clock pulses for the four transitions from pulse 218, each of the intervening pulses (218, 220, 221, and 222) being one bar width each. If the A portion of comparator 152 has a value less than or equal to its B portion, the scanner will be assumed to have scanned across a start portion 12 (or stop portion 16) of a label 10, and will thus generate a momentary start pulse 153 over path 155, for synchronizing the clock circuit (FIG. 5) to be described.

The start pulse, it should be noted, is assumed to have resulted from a scan over a start portion 12 of a valid label 10 even though certain combinations of printed matter and other indicia on a container 30 could conceivably have simulated such a start section. Nevertheless, a series of checks or verifications that subsequent data signals are valid for use in the present scanning apparatus are described in the abovementioned U.S. Pat. No. 3,708,655, issued Jan. 1, 1973.

Referring now to FIG. 5, start signal 153 enables gate 202 over path 155 for the transfer through multiplexer 150 and delay 151 to bar register 182 a count equal to ¼ the count in counter 114 which contains a count accumulated while scanning the four bars 25, 27, 28, and 29, (FIG. 2b) which follow the initial wide outer band 23 on label 10. Delay 151 is provided to ensure that a signal comprising the count is stored momentarily for transfer to the register 182 subsequent to the start pulse 153 as well as after a sufficient period of time during the presence of the start pulse signal 153 to load register 182 even though the register 114, for example, has been cleared. The count being transferred is divided by four to provide an average count corresponding to a count during a scan across a single bar. Even though less than four bars may be used to obtain an average, computer model studies demonstrate that an average of four bars provides a statistically reliable average of a single bar. Thus, in response to start signal 153, register 182 contains a count corresponding to the time required to scan across a single bar on the label.

Start signal 153 through OR gate 200 also provides a reset signal over reset bus 201 which signal clears circuits 160, 162, 164, 166, 170, 172, 174, 176, and 192. Start signal 153 is also applied to the inhibit terminal of an inhibit gate 183 to prevent signals from multiplexer 180, to be described, being commingled with signals from gate 202. The start signals 153 also enable gate 187 to permit the passage of the number contained in register 182 divided by two via divider 186 to be jammed into Down Counter 168 over bus 189. For example, if register 182 is storing the number 42, then the number 21 will be jammed into Down Counter 168.

As system clock 130 continues to produce pulses, counter 168 counts down until it reaches a count of zero, at which time a momentary pulse 90 is generated through decoder 190 coupled to the output of counter 168. It should be noted and understood that pulse 90 serves as a clock signal for synchronizing the operation of the shift register 82, to be described, and the data processor coupled thereto, to the scanning rate, that is, the relative speed or velocity of the scanner and the label.

Clock signal 90 is coupled to the shift (S) input of shift register 82 (FIG. 3) over path 91, which enables the input gate of the shift register to receive information over path 92 from flip-flop 72 and to shift all information in the shift register one position in a manner well known in the art. The division-by-two circuit 186 ensures that the clock pulse 90 will be generated at a time corresponding to the approximate midpoint 226 of pulse 224 of the pulses corresponding to the start portion 12 of label 10 and, more particularly, to the midpoint of bar 31 (FIG. 2b). The mid-point of the pulse is selected to avoid ambiguities which otherwise will occur at the transitions. It will be understood by those skilled in the art that the sharp (vertical) transitions between pulses illustrated in FIG. 6, do not, in fact, occur. Rather, such pulses have poorly defined transition points requiring that the data signal be strobed or synchronized during a portion of each pulse at which portion there are no ambiguities. It should be noted that pulse 224 is the latest transition pulse prior to scanning into the data portion (FI) 14 of the label 10, and is always a ONE or (W) according to the preferred embodiment being described. Clock signal 90 also advances counter 192 from zero to one, and during the short duration that clock signal 90 exists, decoder 194 is rendered operative to generate a signal to enable gate 184. When gate 184 is enabled, the count (namely 42) is jam-transferred from register 182 into counter 168. Down counter 168 begins again to count down towards zero under control of system clock 130. As the counter 168 again reaches the count of zero, a clock pulse 90 will be generated enabling shift register 82 to receive the signal corresponding to the first data bar FI (FIG. 6) as the scanning passes over the first data bar of portion 14. It is noted that the clock pulse signal 80 again occurs at the midpoint of bar FI (FIG. 2a) corresponding to the midpoint of signal pulse FI (FIG. 6) as shown by clock pulse 230 (FIG. 6).

This same clock pulse 230 also causes counter 192 to advance from one (which resulted from the preceeding clock pulse 228) to a count of two. This cycle of operation will be again repeated during the time of a scan from data bar FI to the next succeding data bar 232 (FIG. 2a) of label 10 which will manifest a signal pulse 234 (FIG. 6) and a clock pulse 236 at a time substantially coincident with the midpoint of the bar 232 (FIG. 2a) and, thus, the signal pulse 234 (FIG. 6). This cycle of advancing counter 192 is repeated and is advanced in count for each bar scanned by each clock pulse signal 91. Note that counter 192 is arranged to advance a count of four or more, but to no more than seven and be reset to zero only when a transition pulse 109 occurs and the count is at least four, as will be explained, to thus alter the rate of the clock signal 90 as the rate of scan may change.

Thus, counter 192 will advance to a count of four with four clock signals 90, namely, 228, 230, 236 and 240. Clock pulse 240 advances counter 192 to a count of four, which enables decoder 196. Enabled decoder 196 produces a signal to prime AND gate 198. The next transition pulse 109, manifested by the scan crossing at 242 (FIG. 2a), enables AND gate 198. Enabled gate 198 enables OR gate 200 to produce a reset signal, which causes, over bus 201, a resetting of circuits 160, 162, 164, 166, counters 170, 172, 174, 176 and 192. As counters 170–176 are reset to zero, their counts will be passed to multiplexer 180. Multiplexer 180 is arranged to pass information from any selected counter of counters 170, 172, 174 and 176. The count in bar counter 192 as register 192 is reset determines via control path 193, which of the counters (170–176) is to pass its count to register 182 via inhibit gate 183 now cleared in the absence of the start signal 153. Thus, when bar counter 192 registers a count of four bars, in response to four clock pulses 90, multiplexer 180 is arranged to pass the count from counter 170 to register 182. In like manner, counts of five, six and seven in counter 192 cause the count in counters 172, 174 and 176 respectively, to be passed to register 182 in a manner to be described. Each respective counter 170–176 has been advancing in clock counts from clock 130 modified by dividers 160–166 during the scanning interval of four clock pulses 90 since having been reset by start pulse 153 which, in turn, resulted from a transition between signal pulses 222 and 224 (FIG. 6). Thus, counter 170 after four bar counts in register 192 will have a count of 42 (4/4 × 42), counter 172 a count of (4/5 × 42), counter 174 a count of (4/6 × 42), and counter 176 a count of (4/7 × 42). This accumulation of counts, it is to be noted, is based on the assumption that the scanning rate across the label during this interval has not changed, and further, the four bars being scanned are of the same average uniform width as bars 25, 27, 28 and 29 (FIG. 2b), that determined the initial synchronization rate of the scanning circuit as previously described. These bars on label 10 are thus, "a synchronization code" 33 ("sync code") for in effect, measuring the actual scanning rate (bars per unit time) of the scanner (station 44 or wand 76) and causes the circuit to respond and be synchronized to the subsequent scan assuming the scan rate does not vary drastically within bounds to be described. Further, the sync code 33 on label 10 allows for reliable reading of many different labels, each of which may have bar widths that are different from the bar width on other labels as may occur in practice owing to different manufacturing and printing tolerances. This is accomplished, it will be understood, since the scanning apparatus of the invention determines the rate of the clock pulses 90 by an actual scan of the sync code portion 33 of each label 10 and is not in any way dependent on the bar width of any other label.

However, if in fact the scan rate changes, as is likely or possible with a hand-propelled wand 176, or the bar widths change within a given label, which is less likely to occur, but nevertheless possible, the counts of the respective counters 170–176 will depart from the counts accumulated during the four-bar-count example described below. Thus, if the scan rate is increased by 10%, the count in counter 170 will be either 37 or 38 (based on the calculation 42–4.2) and a corresponding change will occur in counters 172–176. Thus, it will now be understood, that register 182 reflecting such a change will cause, the pulse rate of clock pulses 90 to be increased by 10% and thus to be synchronized to such a 10% change in the scan rate.

The manner in which counts in register 182 is transferred to down counter 168 through gate 188 to provide a means of establishing the sync rate of clock signal 90 is similar to that for transferring a count therein via gate 187 for the start signal 153 and thereby strobe the clock signal position at 228 (FIG. 6), and via gate 184 for maintaining the clock rate of clock signal 91 prior to the combined criterion of four clock pulse 90 periods and a transition 109.

Gate 188 is enabled by the signal produced at the output of AND gate 198 delayed by a suitable delay 199 to pass ½ the count of register 182 to down counter 168. AND gate 198 is enabled by the transition signal 109 which results from transition 242 (FIGS. 2a and 6). Delay 199 provides a delay sufficient to allow the resetting of counters 170–176 and the transfer of a selected count of one of them to register 182.

Using the example described above, for an increase in scan rate of 10%, to illustrate how the scanner measures changes in scan rate the count in counter 170 will be assumed to be 38. Therefore, as counter 170 is reset, its count of 38 is transferred to register 182, replacing the previous registered count therein of 42. Subsequently, gate 188 is enabled and AND gate 198 to pass ½ the count of register 182, namely, a count of 19, to down counter 168. Counter 168, it will be appreciated, has, during the period since the last clock pulse 240 until transition 242, stepped down from a count of 42 to a count greater than 21, probably 23. Regardless, the down counter 168 is jammed via 188 with a count of 19 from register 182 to replace the count remaining ("probably"23). Thus the down counter will arrive at zero under control of system clock 130 sooner than it would have prior to the new count manifesting the 10% increase in scan rate. Accordingly, the rate of clock pulse 90 will change to the new rate and be maintained there at until a change in the scan rate occurs.

It will now be appreciated that counters 172, 174 and 176 accumulate counts during counts of five, six and seven bars. Thus, if seven clock pulses 90, corresponding to a scan of seven bars on label 10, has elapsed since a last reset over path 201, counter 176 will have accumulated a count of 7 × 42/7 or 42, which it is noted, is the same average clock (130) count as occurs for each of the other counters 170–174. According to the invention seven is the maximum count to which bar counter 192 is required to advance in order to establish and maintain synchronizing clock pulses 90 to decode the code of label 10 of the invention.

After the scan is made across the data portion 14 of label 10, the scanner will cross stop portion 16, which as previously indicated is arranged to be reversed both in the order of the direction of scan as well as color as compared to the start portion 33 illustrated in FIG. 2b, and is otherwise identical thereto except that portion 35 preferably is provided with 11 bars rather than 7 for the corresponding start portion, for reasons not related to the present invention.

The stop portion is recognized to provide a suitable "stop" signal to the data processor via shift register 82 to allow for the use of a variable length data label. Referring to FIG. 4, in response to scanning the bars 29, 28, 27, and 25 to stop section 16 corresponding on reverse to section 33 of the start portion (noting that the guard band 31 assures a transition preceding bar 29) the transition pulse 109 (via FIG. 3) corresponding to the transition from bar 25 to 23 (noting that the scan is right-to-left corresponding to the radially inward scan direction) enables register 156. Register 156 enabled, receives a count corresponding to the system clock pulses 130 produced during the scan of bars 29, 28, 27 and 25. Thereafter, during the continued scan of the most inner portion 35 (FIG. 1) 2/3 of the system 130 clock pulses will enter counter 134 via divide circuit 132. The next transition 109 following the end of portion 35 will transfer the count of counter 134 into the B portion of Register 157 while the number from register 156 is transferred to the B portion thereof. When A is less than or equal to the B count, a stop signal is generated over path 158 to the data processor. If a transition signal does not occur owing to the background of the container adjacent the label, a suitable time-out circuit not shown may be provided.

It should be noted that regardless of the direction of scan, that is, inwardly or outwardly of the label 10, the scan circuit generates the start and stop signals at the respective outputs designated on the drawing, as previously indicated.

Table 2 illustrated in drawing FIG. 7 is a tabulation of counts contained in the counts of FIG. 4 described above for determining the start (or stop) signal 153. The numbers representing the counts are based on a rate for system clock 130 providing 42 counts per scan of one bar (which thus is independent of the scan rate). The counts in the column entitled "110" represent counts in ring counter 110 (FIG. 4) for each of its position states 3, 1, 0, 2, 3 keyed to those identified states above wave form 66 (shown in FIG. 6). The other columns, likwise represent the counts for the other counters in FIG. 4. A study of the table will illustrate the typical change in the counters for a scan over the label to read a start signal as described above.

It will thus be appreciated that according to the invention, a data processor may be synchronized to the scanner and that such synchronization is automatically adjusted or altered in response to changes of the rate of scan. The amount of alteration that may be affected in such synchronization is dependent on the dimensional tolerances of the individual bars, the actual size of the bars and the scanner rate across the bars of the label. In accordance with the invention such synchronization may be automatically adjusted for dimensional variations of bars manifested in a given label to as much as 33 percent of such variations in dimensions of bars of large labels to 10 percent for small labels. For the present description, a large label includes those having bar widths of 30 mils while small labels have bar widths of 9 mils. In the industry of packaging, certain tolerances are being considered influenced by the accuracy of printing systems. It is these criteria of accuracy that affect the degree of variations of scan rate operation that can be maintained in synchronization according to the present invention.

It has been determined that notwithstanding the restrictions above described, a variation in speed or scanning rate may be in the order of 2 to 1 during the scanning period of a label. Thus, a scanner starting with a nominal speed or velocity of one may increase to a factor of two or reduce to a factor ½ of the original speed and still not effect synchronization of the processed data read from the label. This is based on studies in the light of the presently viewed tolerances which allow for variations of one percent in speed or scan rate per bar whether the bar be a small or large label.

Thus, the system is capable of synchronizing to scan rates varying as much as in the order of 1000 to 1. A mechanical scanner (scanning station 44 - FIG. 3) scans typically at a rate of 800 nanoseconds per bar while a hand held wand 76 scans a bar of a label in about 0.8 milliseconds, the relative scan rates of the two being 1000 to 1. It will be understood that the rate of the system clock 130 is selected in accordance with the expected range of scanning rates. In one embodiment the system clock is about 50 megahertz to provide thereby 42 pulses per bar for a scan rate of 800 nanoseconds per bar. If 20 pulses per bar were to be the system criterion of a mechanical scan rate, the system clock 130 rate would be in the order of 25 MHz.

Even though the embodiment described is arranged to average any of four to seven bars to maintain and establish the rate of the clock rate 90, for synchronizing the circuit automatically to the scan rate, it will be appreciated that by suitable modification of the circuit illustrated, the clock signals 90 may be resynchronized in response to each transition of the label code and be averaged over any number of preceding bars desired.

Various modifications of the system described in the above embodiment will be apparent to those skilled in the art. For example, the wand 76 illustrated in FIG. 3 may include all or a portion of amplifier 64.

It will be appreciated that although the embodiment described above utilizes optical techniques for reading a label other information processing techniques may be used. For example, the bars on labels may be of magnetic or electrostatic responsive form, the scanning apparatus for which being suitable magnetic or electrostatic scanners known in the art.

What is claimed is:

1. An article of manufacture to be read by optical scanning equipment comprising an information medium on which are a plurality of side-by-side indicators of unit width, U, which may vary from article to article, each unit width being in one or the other of two contrasting colors representing respectively binary 1's and 0's, the characteristic patterns of 1's and 0's differing along a scan line, the indicators being arranged to define a start, data, and stop portion, said start portion comprising a plurality of alternating color single unit width indicators to provide coded information corresponding to the scanning rate thereof, said data indicators being arranged so that no more than four side-by-side adjacent indicators have the same characteristics.

* * * * *